(12) United States Patent
Yun et al.

(10) Patent No.: US 8,542,218 B2
(45) Date of Patent: Sep. 24, 2013

(54) ELECTRONIC SWITCH APPARATUS FOR VEHICLE

(75) Inventors: Jung Hwan Yun, Seoul (KR); Hyun Kim, Hwaseong-si (KR); Hee Sang Park, Hwaseong-si (KR); June Kyu Park, Hwaseong-si (KR); Jun Mo Ku, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 505 days.

(21) Appl. No.: 12/955,707

(22) Filed: Nov. 29, 2010

(65) Prior Publication Data

US 2012/0044208 A1 Feb. 23, 2012

(30) Foreign Application Priority Data

Aug. 19, 2010 (KR) .................. 10-2010-0080221

(51) Int. Cl.
*G09G 5/00* (2006.01)
(52) U.S. Cl.
USPC .......................................................... 345/175
(58) Field of Classification Search
USPC .................. 345/173, 175; 178/18.09, 18.11
See application file for complete search history.

(56) References Cited

U.S. PATENT DOCUMENTS

| | | | | |
|---|---|---|---|---|
| 7,307,661 | B2 * | 12/2007 | Lieberman et al. | 348/333.1 |
| 7,489,303 | B1 * | 2/2009 | Pryor | 345/173 |
| 8,373,657 | B2 * | 2/2013 | Hildreth | 345/158 |
| 2002/0075240 | A1 * | 6/2002 | Lieberman et al. | 345/170 |
| 2004/0102247 | A1 * | 5/2004 | Smoot et al. | 463/36 |
| 2004/0108990 | A1 * | 6/2004 | Lieberman et al. | 345/156 |
| 2004/0246338 | A1 * | 12/2004 | Lieberman et al. | 348/207.1 |
| 2005/0168448 | A1 * | 8/2005 | Simpson | 345/173 |
| 2006/0007170 | A1 * | 1/2006 | Wilson et al. | 345/173 |
| 2008/0211779 | A1 * | 9/2008 | Pryor | 345/173 |
| 2009/0091540 | A1 * | 4/2009 | Doan et al. | 345/173 |
| 2010/0060611 | A1 * | 3/2010 | Nie | 345/175 |
| 2011/0029185 | A1 * | 2/2011 | Aoki et al. | 701/29 |
| 2011/0095995 | A1 * | 4/2011 | Dassanayake et al. | 345/173 |
| 2011/0169746 | A1 * | 7/2011 | Kitajima | 345/173 |
| 2011/0254811 | A1 * | 10/2011 | Lawrence et al. | 345/175 |

FOREIGN PATENT DOCUMENTS

JP 2007-328754 A 12/2007

\* cited by examiner

*Primary Examiner* — Tom Sheng
(74) *Attorney, Agent, or Firm* — Morgan, Lewis & Bockius LLP

(57) ABSTRACT

An electronic switch apparatus for a vehicle, may include a projector module implementing a plurality of switch images, a sensor module detecting locations of respective switch image by recognizing the switch images implemented by the projector module as two-dimensional images, an infrared module emitting infrared rays to areas of the switch images displayed by the projector module, and a control module for, when a specific area of the switch images may be touched, detecting coordinates of the specific area by measuring light reflected from emitted infrared rays of the infrared module, and executing an operation of a switch corresponding to the coordinates.

5 Claims, 4 Drawing Sheets

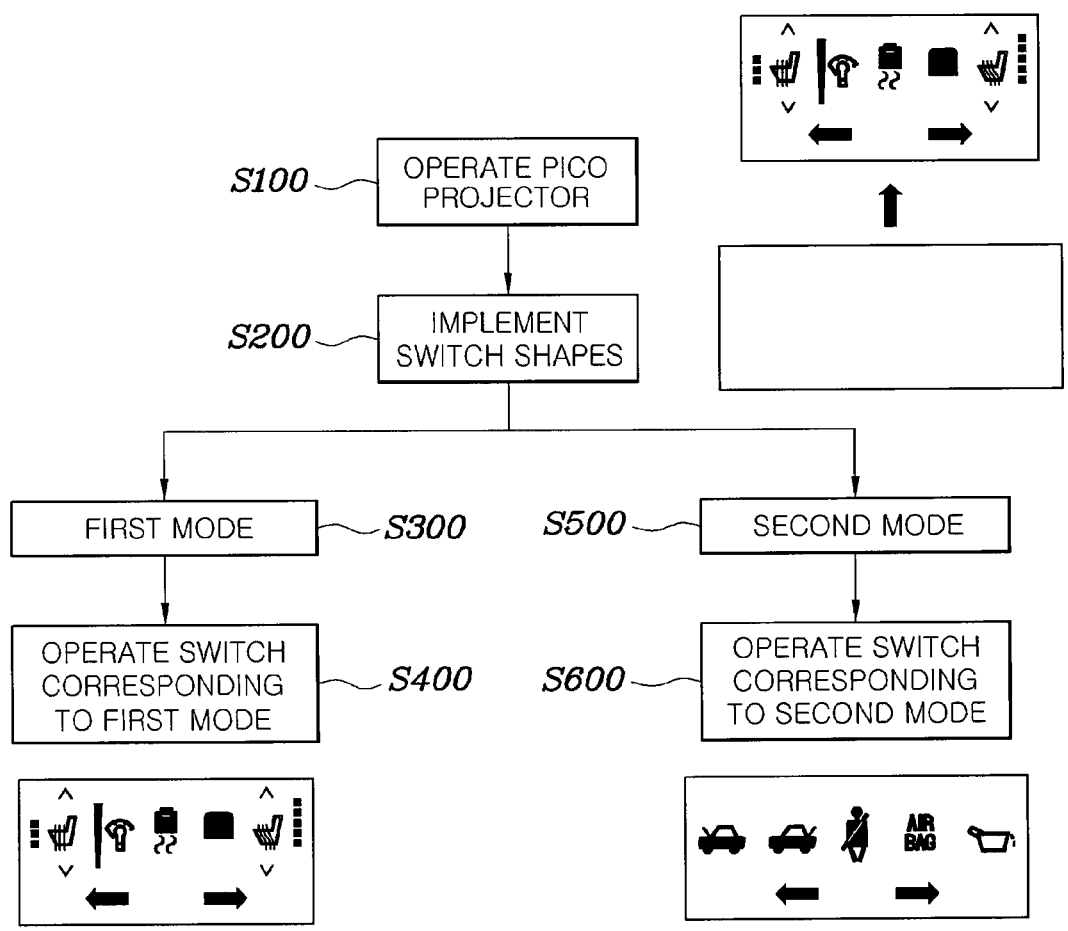

ELECTRONIC SWITCH APPARATUS FOR VEHICLE

CROSS-REFERENCE TO RELATED APPLICATIONS

The present application claims priority to Korean Patent Application No. 10-2010-0080221 filed on Aug. 19, 2010, the entire contents of which is incorporated herein for all purposes by this reference.

BACKGROUND OF THE INVENTION

1. Field of the Invention

The present invention relates generally to an electronic switch apparatus, and, more particularly, to an electronic switch apparatus for a vehicle, which can implement a plurality of switches in the limited space of the inside of a vehicle.

2. Description of Related Art

Generally, a vehicle is equipped with various kinds of switch buttons in order to use devices provided in the vehicle but such switch buttons are provided in a limited space due to limitations in their number and space.

Meanwhile, there is a trend to miniaturize the portable input devices, such as Personal Digital Assistants (PDAs), mobile phones, and Portable Media Players (PMPs), which are being developed, and the input devices perform their input function using a projection keyboard which is a kind of virtual switch because of limitation in the size of products.

A projection keyboard is configured to form a keyboard template using visible rays, and to display a letter by determining the letter corresponding to a specific area where a finger is located when the finger is located in the area of the keyboard template.

However, since conventional projection keyboards are projectors using laser and can implement only a single color, they are accompanied by the problem that the figures on the switches cannot be replaced, so that only a limited number of switches can be implemented. Therefore, when such a projection keyboard which is a virtual switch is mounted in a vehicle, the problem occurs of it being difficult to apply a plurality of switch buttons in a limited space, so that mounting efficiency decreases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an electronic switch apparatus for a vehicle, which can implement a large number of switches in a limited space.

In an aspect of the present invention, the electronic switch apparatus for a vehicle, may include a projector module implementing a plurality of switch images, a sensor module detecting locations of respective switch image by recognizing the switch images implemented by the projector module as two-dimensional images, an infrared module emitting infrared rays to areas of the switch images displayed by the projector module, and a control module for, when a specific area of the switch images may be touched, detecting coordinates of the specific area by measuring light reflected from emitted infrared rays of the infrared module, and executing an operation of a switch corresponding to the coordinates.

The switch images implemented by the projector module may further may include at least a mode conversion switch image, and when one of the at least a mode conversion switch image may be touched, the control module displays switch images having other shapes than the plurality of switch images.

When one of the mode conversion switch images may be touched, the control module forms a group of switch images having other shapes, and then displays the group.

Each of the mode conversion switch images may be formed to correspond to a relevant switch image, and, when the mode conversion switch image may be touched, the control module replaces the corresponding switch image by a switch image having another shape.

The plurality of switch images may be implemented on upper portion of a console.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is a flowchart showing the operation of the electronic switch apparatus for a vehicle according to an exemplary embodiment of the present invention.

Figure 1:
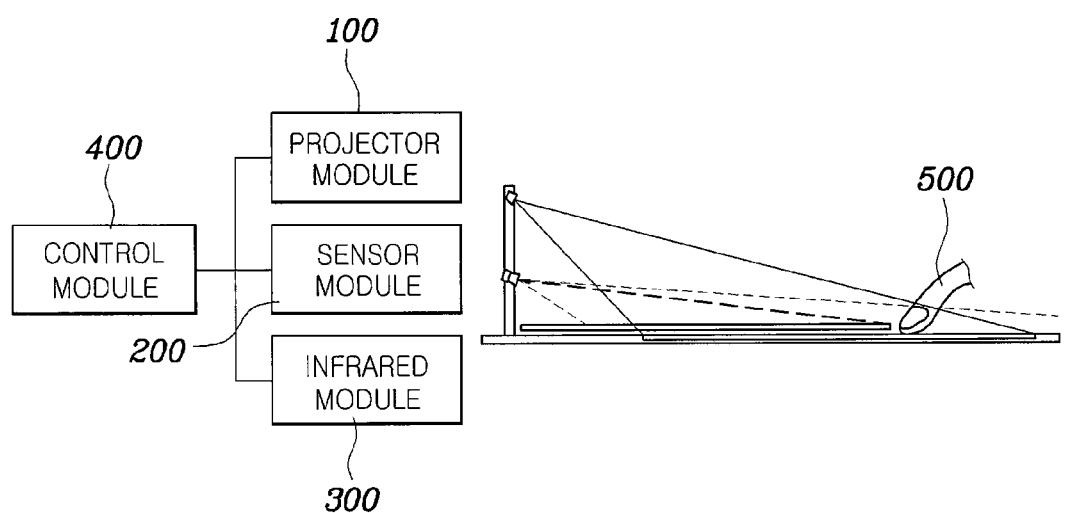
FIG. 1 is a diagram showing an electronic switch apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 2:
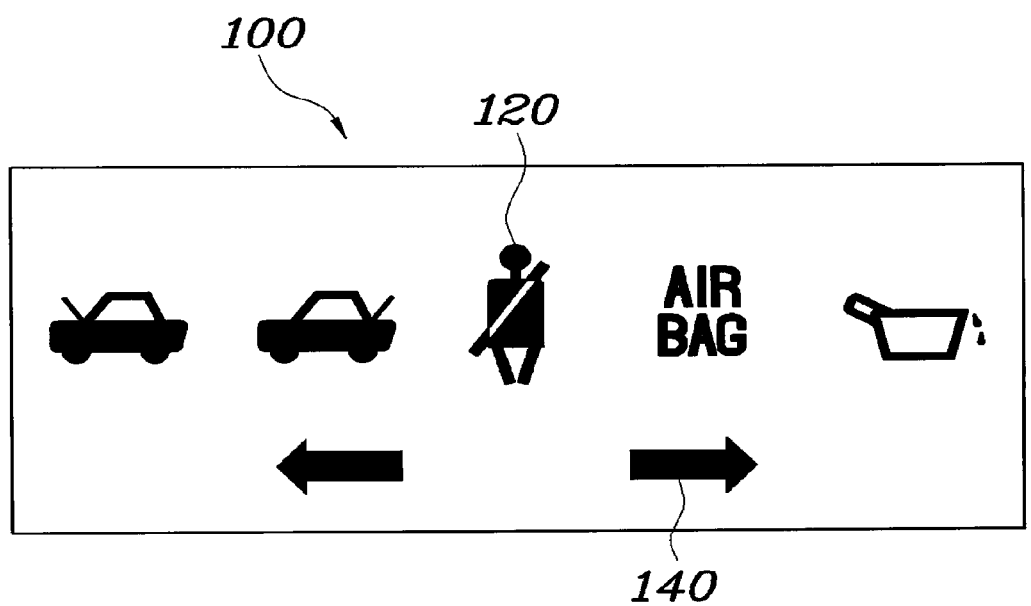
FIG. 2 is a view showing an image implemented by the projector module of the electronic switch apparatus for a vehicle according to an exemplary embodiment of the present invention.
Figure 3:
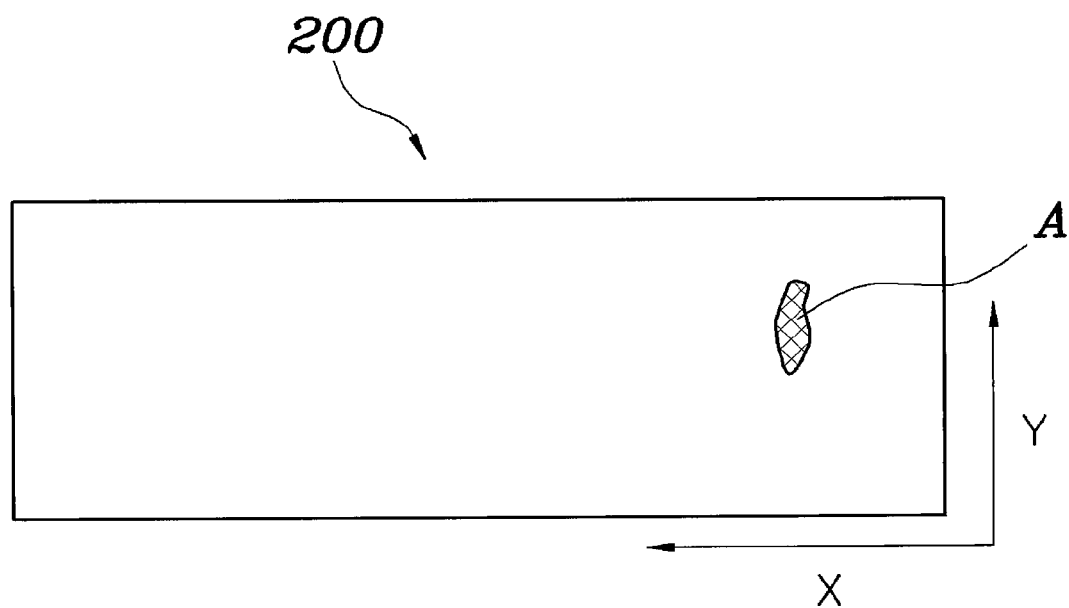
FIG. 3 is a view showing an image implemented by the sensor module of the electronic switch apparatus for a vehicle according to an exemplary embodiment of the present invention.

FIG. 1 is a diagram showing an electronic switch apparatus for a vehicle according to the present invention, FIG. 2 is a view showing an image implemented by the projector module of the electronic switch apparatus for a vehicle according to the present invention, FIG. 3 is a view showing an image implemented by the sensor module of the electronic switch apparatus for a vehicle according to the present invention, and FIG. 4 is a flowchart showing the operation of the electronic switch apparatus for a vehicle according to the present invention.

Referring to FIG. 1, the electronic switch apparatus for a vehicle according to an exemplary embodiment of the present invention includes a projector module 100 for implementing a plurality of switch images, a sensor module 200 for detecting the locations of the respective switch image by recognizing the switch images implemented by the projector module 100, an infrared module 300 for emitting infrared rays into the areas of the switch images displayed by the projector module 100, and a control module 400 for, when a specific area of one of the displayed switch images is touched, measuring the coordinates of the corresponding switch and then executing the operation of the switch corresponding to the measured coordinates.

The projector module 100 is mounted inside a vehicle, and, more particularly, may be mounted in such a way that images are implemented on the upper portion of a console so that a driver can easily touch the image. The projector module 100 can perform display so that a plurality of switches 120 are implemented as shown in FIG. 2, and the implemented switches 120 may include a safety belt, a trunk, a hood, an airbag, and engine oil.

Further, the images of mode conversion switches 140 may be displayed in one side of the displayed switch images so that the plurality of displayed switches can be replaced by switches having other figures. Each of the images of the mode conversion switches 140 can form a group of all the displayed switch images and then replace the displayed switch images by switch images having other shapes, for example, switch images indicating an emergency light, the operation of an air conditioner, and a seat warmer.

Of course, the mode conversion switches 140 may not form a group of all the switches 120 and then replace the shapes of the switches. That is, the mode conversion switches 140 may be formed to correspond to the respective images of the switches 120, and, when a specific switch 120 is touched, only the image of the corresponding switch 120 may be replaced by a switch image having another shape. This creates an advantage of reducing the amount of trouble for a driver by leaving one or more switches necessary for driving and replacing only unnecessary switches.

Here, a pico projector may be used as the projector module 100 from among various kinds of imaging devices. Images can be displayed using Liquid Crystal Displays (LCDs), Plasma Display Panels (PDPs), and Light Emitting Diodes (LEDs).

In order to recognize the images implemented by the projector module 100, the sensor module 200 may be provided in one side of the projector module 100, for example, beneath the projector module 100. The sensor module 200 can detect the locations of the respective switch areas by capturing the images implemented by the projector module 100 and recognizing the implemented images as 2-dimentonal images.

As shown in FIG. 3, when a spot touched by a finger is sensed by the sensor module 200, the spot can be known by its X and Y coordinates and a switch image corresponding to the coordinates can be detected.

The location touched by a finger can be measured based on light emitted from the infrared module 300. For this purpose, the infrared module 300 may be provided in one side of the sensor module 200. The infrared module 300 functions to emit infrared rays to the areas of the images displayed by the projector module 100. When a specific spot of the images is touched by a finger, the spot touched by the finger can be measured by reflecting infrared light in the finger.

The control module 400 functions to detect a switch image where the touch was performed, and to provide a signal so that the operation of the corresponding switch is performed.

When a driver touches a specific area of the images implemented by the projector module 100, the control module 400 measures infrared rays reflected in the finger which performed the touch, detects the coordinates of the image corresponding to the infrared rays using the sensor module 200, and implements the location of the finger using X and Y coordinates. Therefore, the kind of the switch corresponding to the X and Y coordinates can be known, and the control module 400 can execute the operation of the corresponding switch.

Further, when the images implemented by the projector module 100 are replaced with other switch images by the mode conversion switches 140, the control module 400 can recognize switches corresponding to the respective replaced switch images and can perform the operations of the inner devices of a vehicle, the operations being related to the respective corresponding switches.

Hereinafter, the operation of the electronic switch apparatus for a vehicle according to an exemplary embodiment of the present invention will be described with reference to FIG. 4.

First, the projector module 100 is operated so that a plurality of switch images are formed into a group and then implemented at step S100. When the projector module is operated, the plurality of switch images are formed into a group and then displayed on the upper portion of a console at step S200.

Thereafter, it is determined whether to operate the switch images in a first mode or to operate other switch images by changing the mode, and then the images of the mode conversion switches 140 are manipulated according to the determination.

In the case of the first mode, for example, when it is desired to execute one of the operations of the switches while the current switch images are being viewed, one of the displayed switch images is selected in the state where the mode conversion switches are not being pressed.

When one of the plurality of switch images is selected at step S300, the control unit operates a device corresponding to the selected switch image, and then finishes the operation at step S400.

Meanwhile, in the case of a second mode, for example, when it is desired to select one of switches corresponding to other images which are not being implemented at step S500, a driver presses one of the mode conversion switches 140 so that a group of switch images having other shapes is displayed.

When the group of the switch images having other shapes is displayed, the driver selects one of the displayed switch images, and the control module 400 operates a device corresponding to the selected switch image, and then finishes the operation at step S600.

The above-described invention uses a pico projector module which can implement various kinds of images, and adds the functions of the mode conversion switches so that the shapes of switches are replaced, thereby generating an advantage of implementing a large number of switches in a small space.

The present invention uses a projector module which can implement various kinds of images, and includes the functions of mode conversion switches so that switch images are replaced according to a use mode, thereby generating an advantage of implementing various kinds of switches in a limited area.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electronic switch apparatus for a vehicle, comprising:
   a projector module implementing a plurality of switch images;
   a sensor module detecting locations of respective switch image by recognizing the switch images implemented by the projector module as two-dimensional images;
   an infrared module emitting infrared rays to areas of the switch images displayed by the projector module; and
   a control module for, when a specific area of the switch images is touched, detecting coordinates of the specific area by measuring light reflected from emitted infrared rays of the infrared module, and executing an operation of a switch corresponding to the coordinates.

2. The electronic switch apparatus as set forth in claim 1,
   wherein the switch images implemented by the projector module further comprise at least a mode conversion switch image; and
   wherein, when one of the at least a mode conversion switch image is touched, the control module displays switch images having other shapes than the plurality of switch images.

3. The electronic switch apparatus as set forth in claim 2, wherein, when one of the mode conversion switch images is touched, the control module forms a group of switch images having other shapes, and then displays the group.

4. The electronic switch apparatus as set forth in claim 2,
   wherein each of the mode conversion switch images is formed to correspond to a relevant switch image; and
   wherein, when the mode conversion switch image is touched, the control module replaces the corresponding switch image by a switch image having another shape.

5. The electronic switch apparatus as set forth in claim 1, wherein the plurality of switch images is implemented on upper portion of a console.

* * * * *